United States Patent [19]

Ito et al.

[11] Patent Number: 5,292,052
[45] Date of Patent: Mar. 8, 1994

[54] CONTINOUS HOT ROLLING METHOD AND JOINING METHOD OF SHEET BAR

[75] Inventors: Nobuhiro Ito; Toshisada Takechi; Hideo Takekawa; Fujio Aoki; Hiroyuki Yoshimura; Norio Takashima; Masanori Ebihara; Masanori Kitahama, all of Chiba, Japan

[73] Assignee: Kawasaki Steel Corporation, Kobe, Japan

[21] Appl. No.: 847,063

[22] PCT Filed: Aug. 1, 1991

[86] PCT No.: PCT/JP91/01030

§ 371 Date: Apr. 2, 1992

§ 102(e) Date: Apr. 2, 1992

[87] PCT Pub. No.: WO92/02314

PCT Pub. Date: Feb. 20, 1992

[30] Foreign Application Priority Data

Aug. 2, 1990 [JP] Japan .................................. 2-203995
Aug. 2, 1990 [JP] Japan .................................. 2-203998
Apr. 20, 1991 [JP] Japan .................................. 3-115232
May 20, 1991 [JP] Japan .................................. 3-142657

[51] Int. Cl.⁵ .............................................. B21D 39/00
[52] U.S. Cl. ........................................ 228/158; 228/170
[58] Field of Search ................ 228/158, 5.7, 170, 160, 228/173.6, 173.7

[56] References Cited

U.S. PATENT DOCUMENTS

| | | | |
|---|---|---|---|
| 2,641,674 | 6/1953 | Orr et al. .................................. | 228/189 |
| 4,132,342 | 1/1979 | Nitto et al. .................................. | 228/158 |
| 4,294,394 | 10/1981 | Iida et al. .................................. | 228/5.7 |
| 4,660,754 | 4/1987 | Byrd .................................. | 228/151 |
| 4,706,871 | 11/1987 | Kajiwara et al. .................................. | 228/158 |
| 4,840,303 | 6/1989 | Fujii et al. .................................. | 228/170 |

FOREIGN PATENT DOCUMENTS

| | | | |
|---|---|---|---|
| 0184481 | 9/1985 | Japan .................................. | 228/158 |
| 0213379 | 10/1985 | Japan .................................. | 228/158 |
| 0126983 | 6/1986 | Japan .................................. | 228/5.7 |

OTHER PUBLICATIONS

JP, B1. 48-393 (Sumitomo Electric Industries, Ltd.) Jan. 8, 1973, Lines 29-23, right column, pg. 1.
JP, A, 61-52993 (Sumitomo Metal Industries, Ltd.), Mar. 15, 1986, Lines 5-24, right column, page 1.
JP, A, 60-184483 (Mitsubishi Heavy Industries, Ltd.), Sep. 19, 1985, Lines 5-12, right column, p. 1.
Patent Abstracts of Japan, vol. 9, No. 252 (M-420) (1975), Oct. 9, 1985.
Patent Abstracts of Japan, vol. 8, No. 263 (M-342), Dec. 4, 1984.
Patent Abstracts of Japan, vol. 8, No. 270 (M-344)(1707), Dec. 11, 1984.
Database WPI, Section Ch, Week 7628, Derwent Publications Ltd., London, Great Britain, Class M21, AN 76-52785X(28).
Patent Abstracts of Japan, vol. 12, No. 321 (M-736) (3168), Aug. 31, 1988.
Patent Abstracts of Japan, vol. 11, No. 205 (M-603) (2652), Jul. 3, 1987.
Patent Abstracts of Japan, vol. 9, No. 226 (M-412) (1949), Sep. 12, 1985.
Patent Abstracts of Japan, vol. 11, No. 82 (M-571), Mar. 12, 1987.
Patent Abstracts of Japan, vol. 10, No. 333 (M-534), Nov. 12, 1986.

*Primary Examiner*—Kurt C. Rowan
*Assistant Examiner*—Chuck Y. Mah
*Attorney, Agent, or Firm*—Dvorak and Traub

[57] ABSTRACT

In the continuously hot rolling of plural sheet bars, in order to simply and surely join the sheet bars to the back end portion of the preceding sheet bar and the front end portion of the succeeding sheet bar are prejoined by butting to each other at an entrance side of a finish rolling mill and then bitten into the finish rolling mill, during which the joining of the sheet bars are promoted to conduct the continuous rolling.

9 Claims, 16 Drawing Sheets

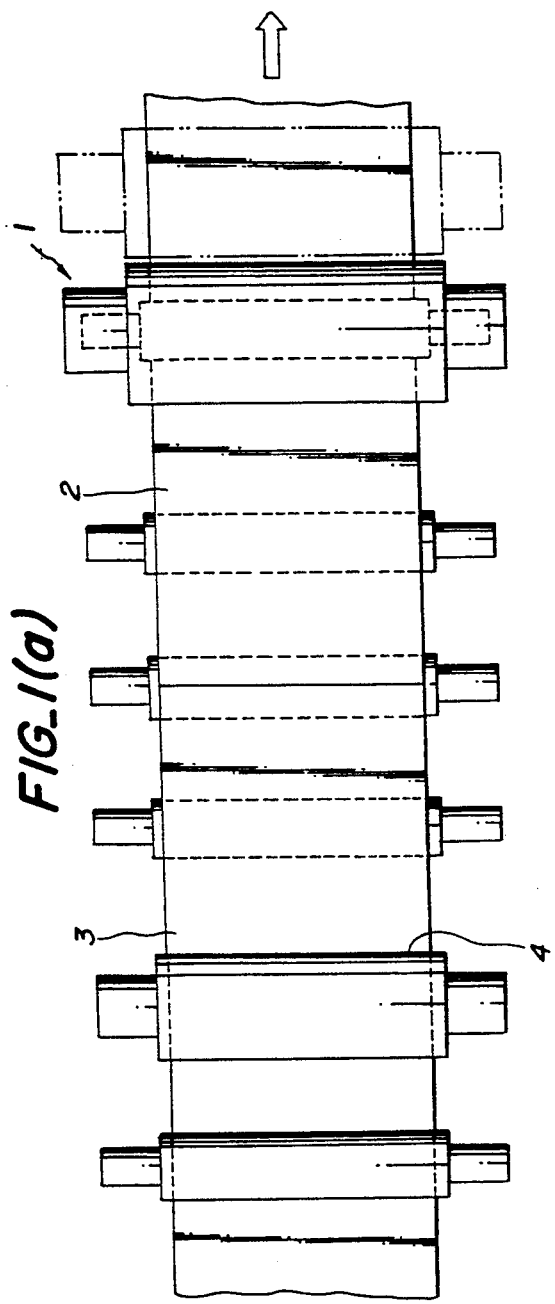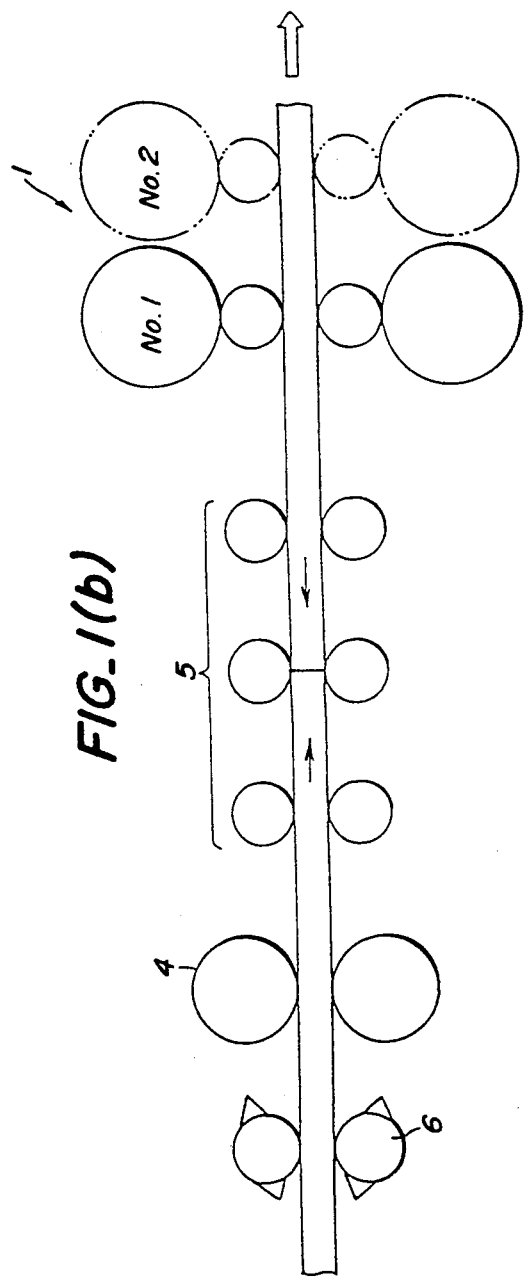

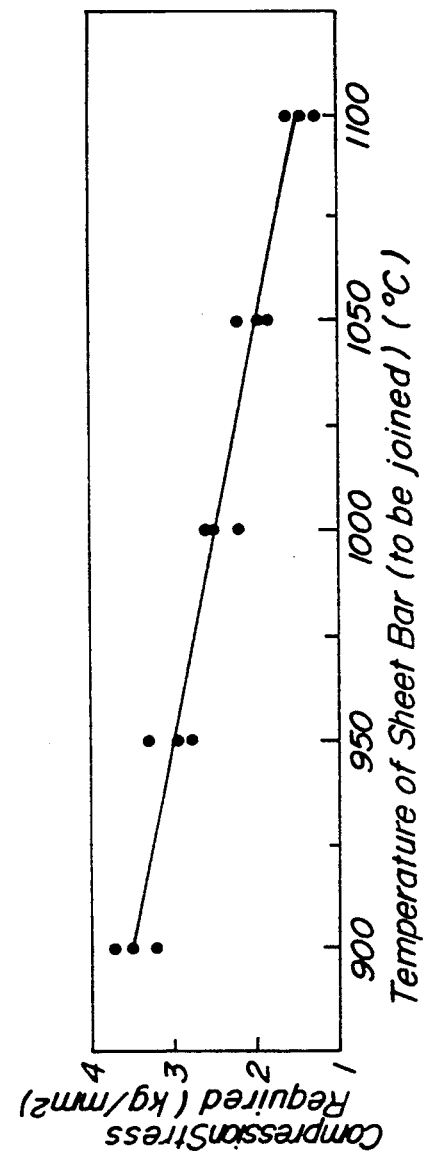
FIG_3

FIG_4(a)
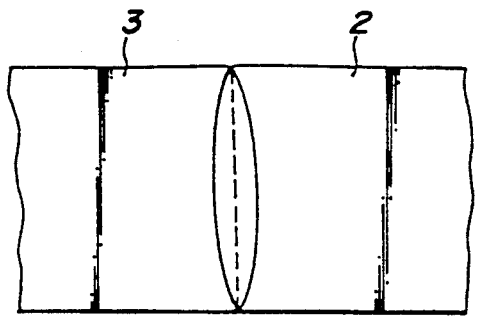
FIG_4(b)
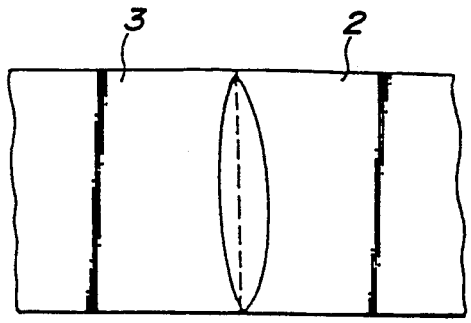
FIG_4(c)
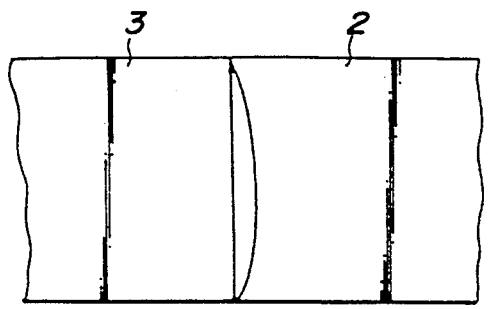
FIG_4(d)
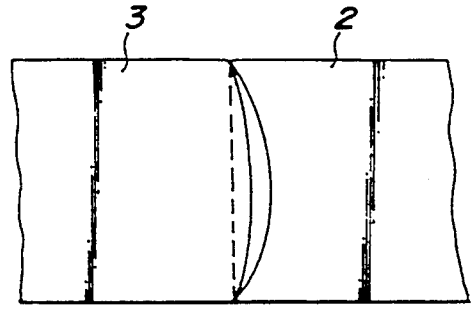
FIG_4(e)
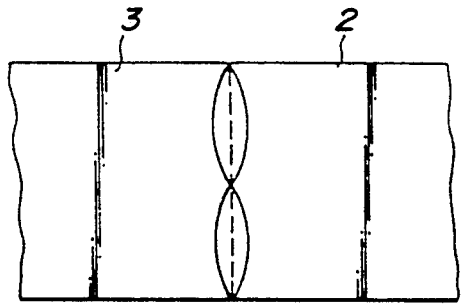
FIG_4(f)
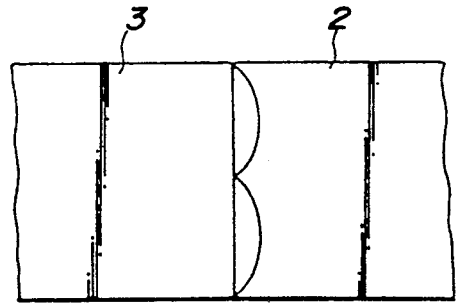
FIG_4(g)
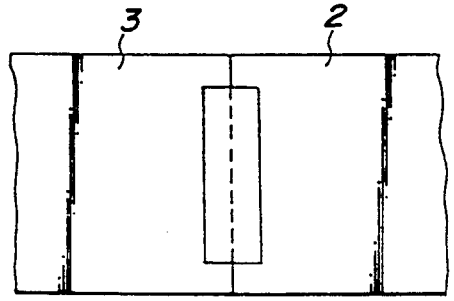

FIG_5(a)
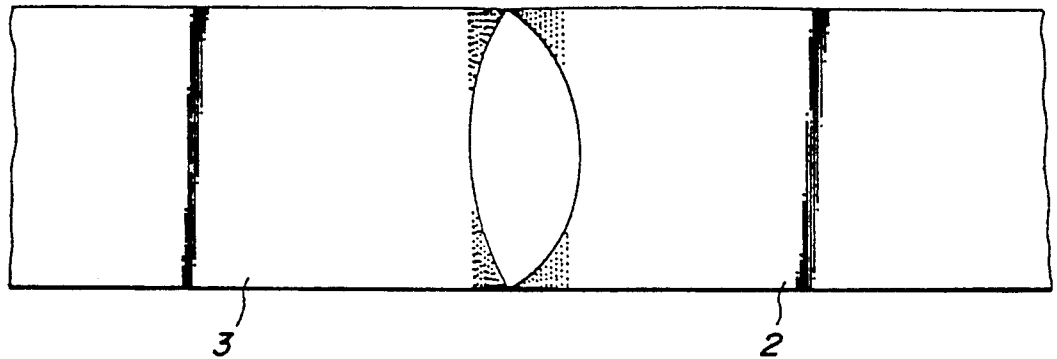
FIG_5(b)
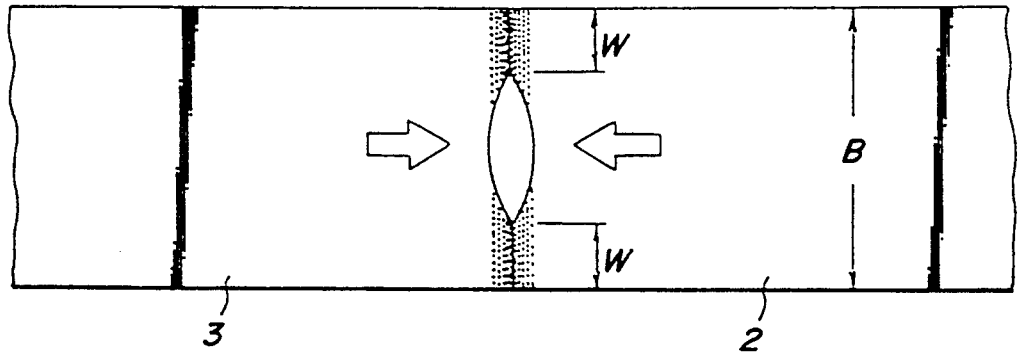

FIG_6
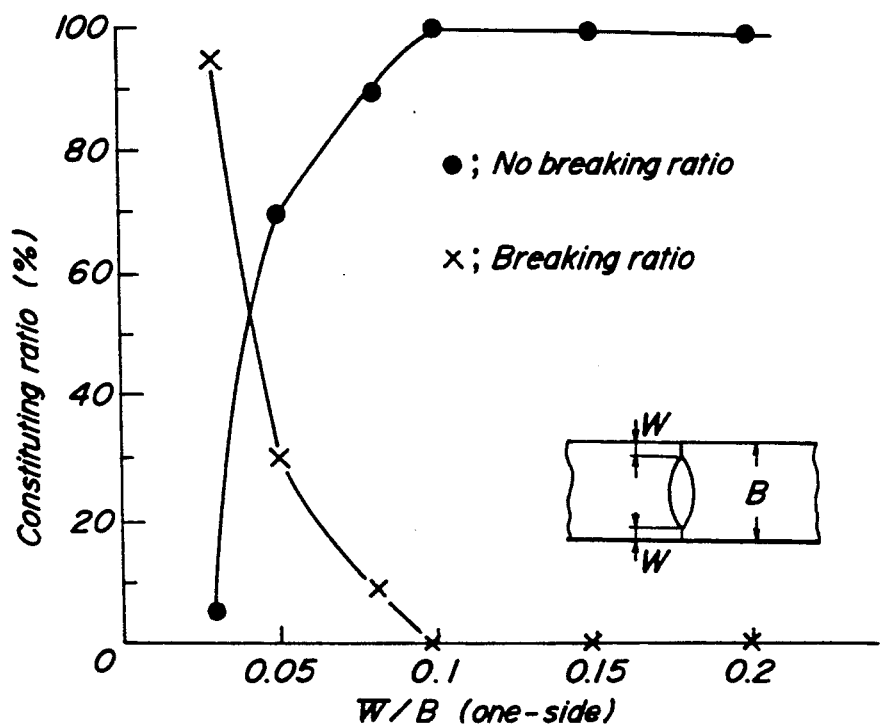

FIG_8
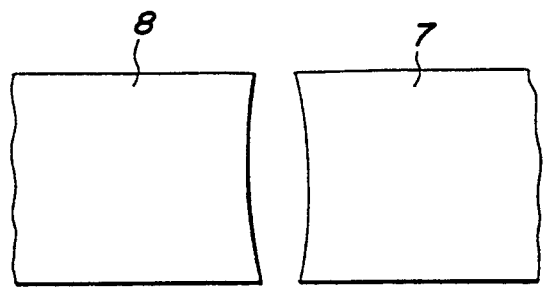
FIG_9
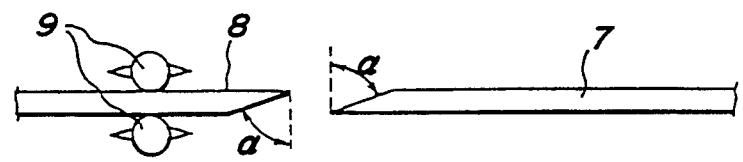

FIG_10(a)
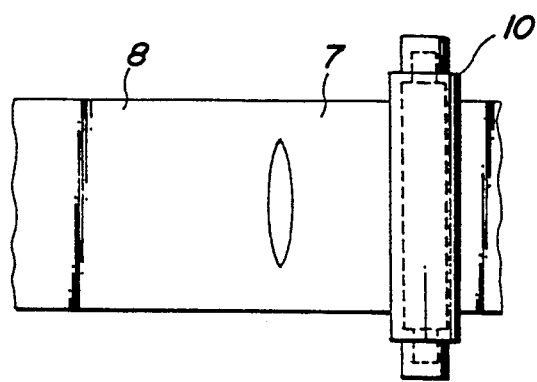
FIG_10(b)
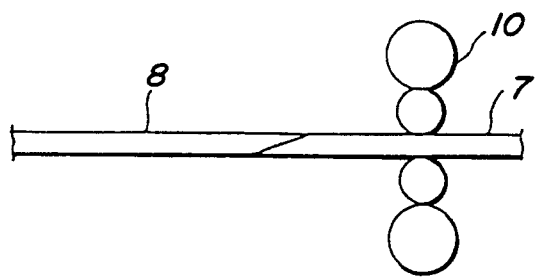

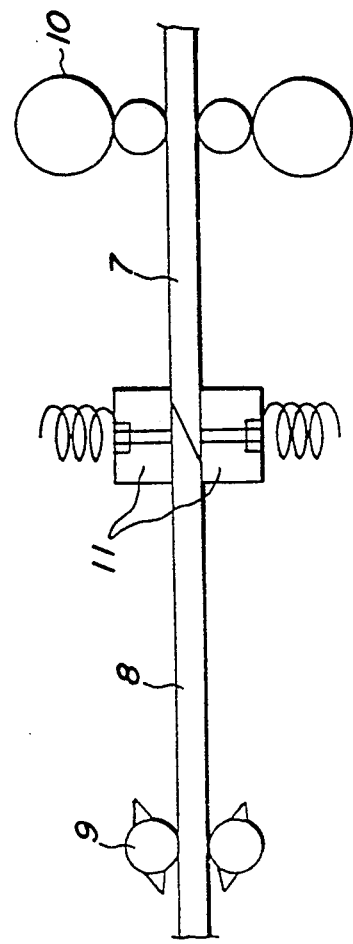
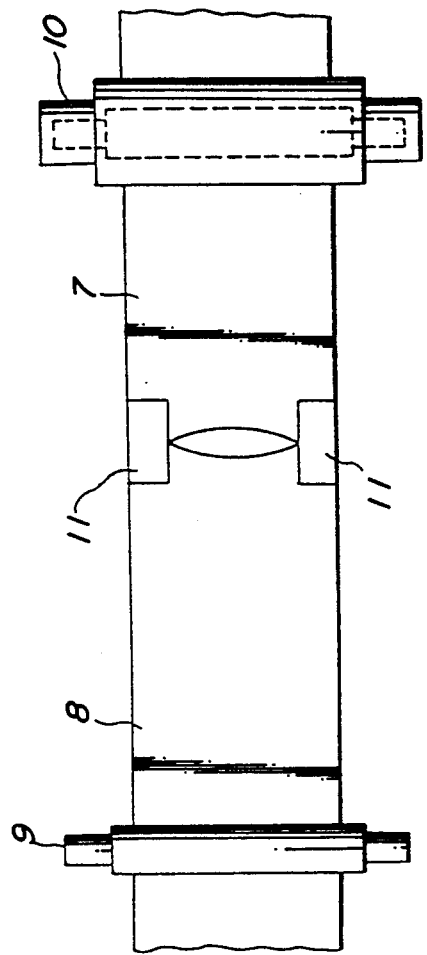
FIG._11(a)
FIG._11(b)

FIG_12
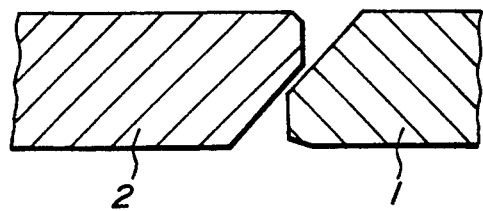
FIG_13
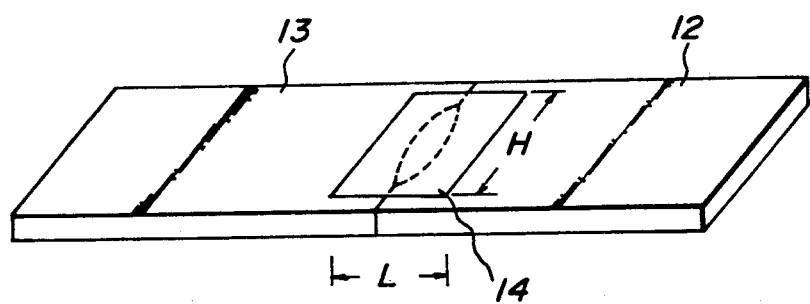

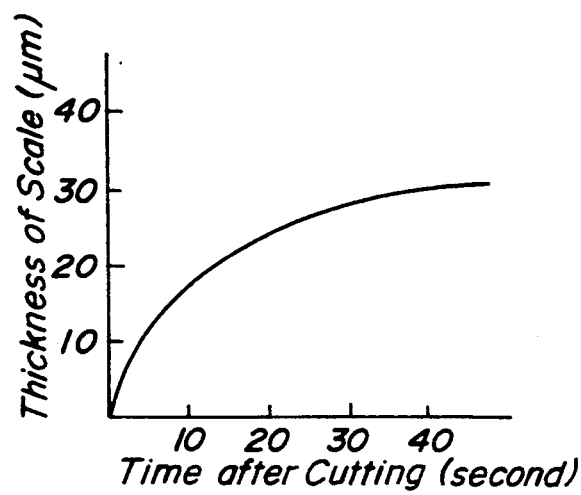
FIG_16
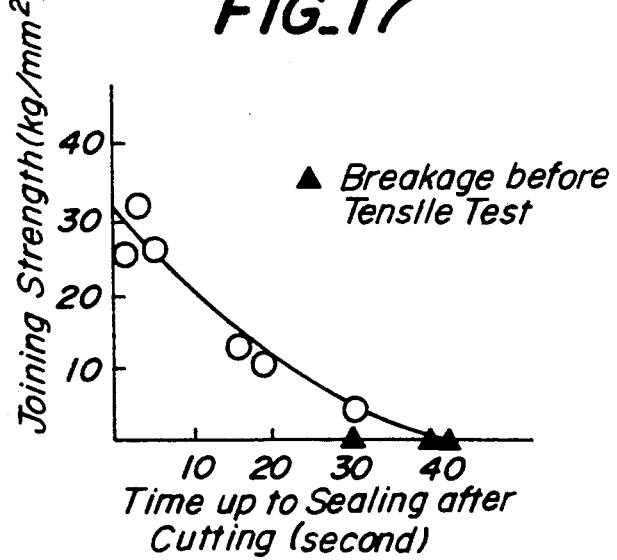
FIG_17

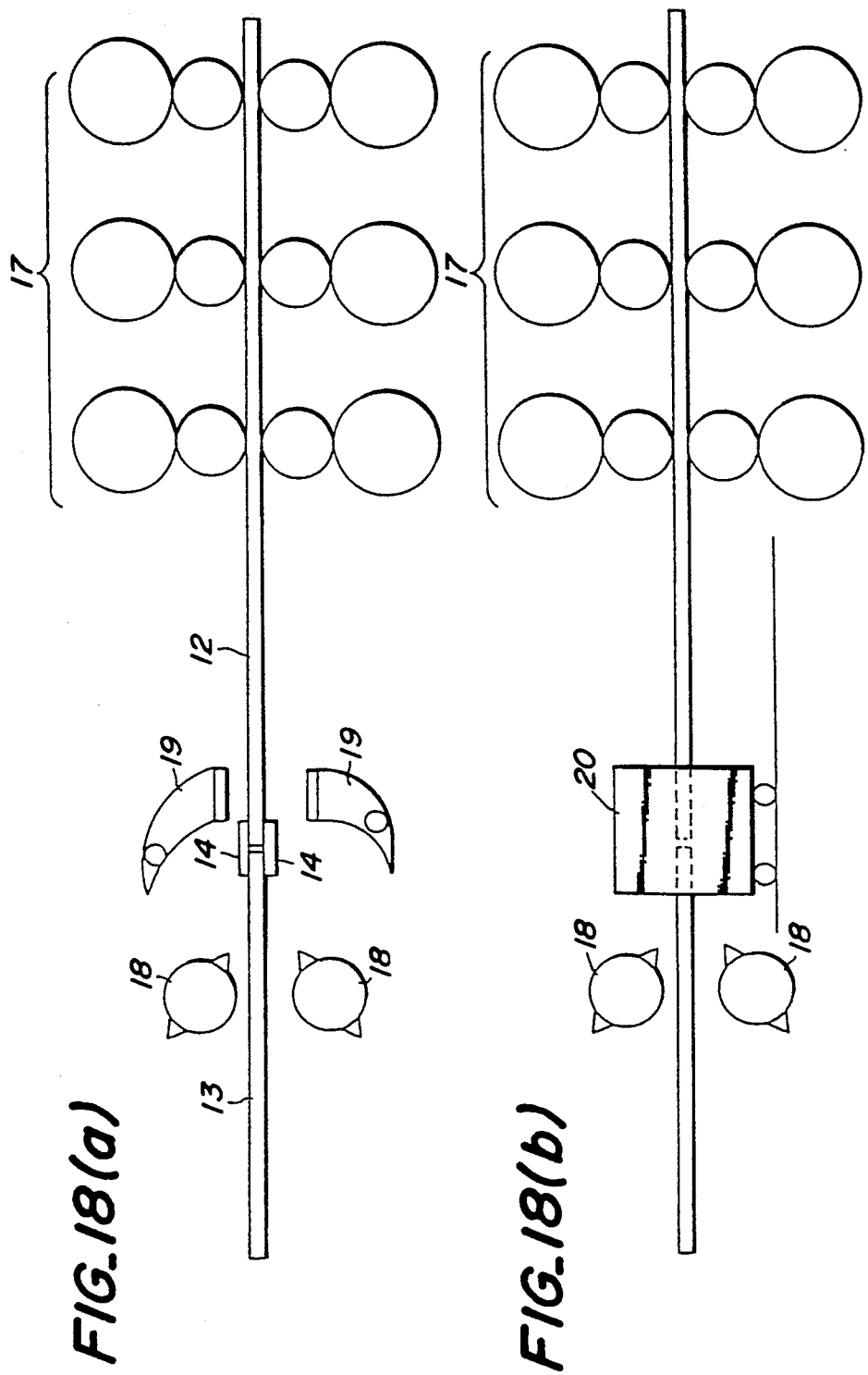

FIG_20(a)
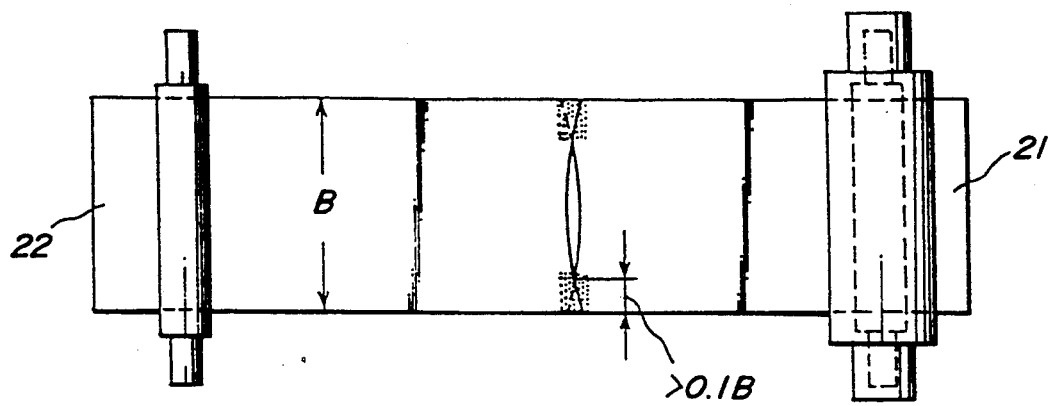
FIG_20(b)
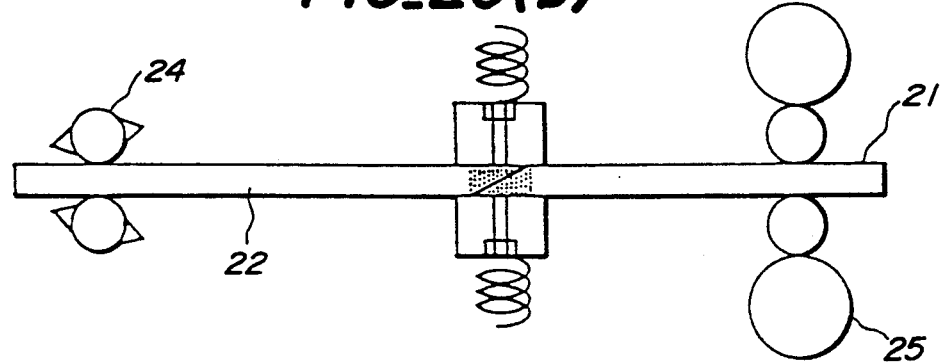
FIG_21
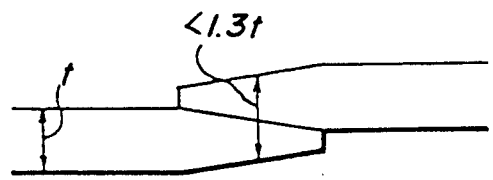

CONTINOUS HOT ROLLING METHOD AND JOINING METHOD OF SHEET BAR

BACKGROUND OF THE INVENTION

1. Field of the Invention

This invention relates to a continuous hot rolling method suitable for continuously hot rolling plural sheet bars inclusive of slabs at every several bars to several ten bars and a joining method aiming at rapid and simple joining operation therefor.

2. Description of Related Art

Heretofore, the sheet bar to be rolled has been heated, rough rolled and then finish rolled every one sheet bar to form a hot rolled sheet having a desired thickness in a hot rolling line. However, in such a rolling system, there are problems that the stop of the line is apt to be caused due to poor biting of rolling material in the finish rolling and the yield lowers due to the poor shape of front and back end portions of the rolling material. Recently, in order to avoid these problems and more improve the productivity, there is adopted a rolling system that the back end portion of the preceding sheet bar and the front end portion of the succeeding sheet bar are previously joined in the transfer line at an entrance side of a hot finish rolling line and then continuously fed into the hot finish rolling line.

As such a-continuous rolling of the sheet bar, there are mentioned techniques disclosed in Japanese Patent laid open No. 60-40601, Japanese patent laid open No. 60-244401, Japanese Patent laid open No. 61-159285, Japanese patent laid open No. 53-138960 and the like.

In the technique disclosed in Japanese Patent laid open No. 60-40601, the front end portion of the succeeding sheet bar is joined to the back end portion of the preceding sheet bar at an entrance of the rolling mill by pushing the cut face of the back end portion to the cut face of the front end portion. In this technique, however, it is necessary to give a certain strain to a joining region between the sheet bars in order to surely join the sheet bars at the entrance side of the finish rolling mill so as to be sufficiently durable to subsequent rolling. In order to push the succeeding sheet bar of giving such a strain, it is avoided to make the equipment itself large. Furthermore, the time required for the joining becomes long, so that when the joining is conducted at a state of stopping the transfer of the sheet bar, a long loop for absorbing it is required, while when the joining is conducted in synchronousness with the transfer of the sheet bar, the length of the equipment should undesirably be made long.

In the techniques disclosed in Japanese Patent laid open No. 60-244401 and Japanese Patent laid open No. 61-159285, the portion of the sheet bars to be joined are heated to a given temperature by the heating means and then pushed to each other to join them. According to this joining manner, the sheet bars can be joined to each other at a relatively small pushing force, but a great amount of power applied is undesirably required.

In the technique of Japanese Patent laid open No. 53-138960, it is required to take a complicated operation for making the end portion of the sheet bar into an optimum joining shape, so that it is not an effective manner.

As to the continuous rolling of the sheet bar in addition to the above techniques, Japanese Patent laid open No. 51-59749 discloses a method wherein the joining portion between the preceding sheet bar and the succeeding sheet bar is descaled or descaled and temperature-raised and thereafter the sheet bars are spot welded at a pushed state and gradually joined and rolled, while Japanese Patent laid open No. 51-130665 discloses a method wherein the back end of the preceding sheet bar is overlapped with the front end of the succeeding sheet bar and the overlapped joining portion is obliquely cut at a given angle with respect to the axial direction of the sheet bar over the widthwise direction.

Even when the descaling is carried out for joining the sheet bars by the method disclosed in Japanese Patent laid open No. 51-59749, the formation of scale reaches several ten micrometers for 10 seconds, so that it may be said that the joining strength is insufficient. In order to suppress such a scale, it is necessary to conduct the descaling or temperature rising just before the rolling, so that the length of the equipment becomes longer. Furthermore, the temperature rising is carried out in a non-oxidizing atmosphere, so that there is a problem that the equipment becomes large-scale.

In the method disclosed in the Japanese Patent laid open No. 51-130665, there is a problem that a long time is required at a step of overlapping the back end of the preceding sheet bar with the front end of the succeeding sheet bar and a step of cutting by oxygen gas or the like, and also the formation of scale is undesirably caused in the section cut by oxygen gas. Further, since the front end of the succeeding sheet bar is accelleratedly pushed toward the back end of the preceding sheet bar, the joint faces are not properly joined to each other.

As to the continuous rolling of the sheet bar, Japanese Patent laid open No. 61-144203 discloses a method wherein the back end portion of the preceding transferred sheet bar and the front end portion of the succeeding transferred sheet bar are butted over their full faces at the entrance side of the rolling mill and both side edge regions of the sheet bars in the widthwise direction are preliminarily joined and then the rolling is conducted at this state. In this method, however, an arc welding is mentioned as a concrete means for preliminarily joining the sheet bars, and such a means takes a time for prejoining, so that it is obliged to prolong the joining time for giving the sufficient joining strength at the prejoined portion and also it is required to elongate the joining line.

Further, Japanese Patent laid open No. 59-137106 proposes a method wherein a press forming machine is disposed at an entrance side of a rough rolling mill or a finish rolling mill and joining portions of the preceding and succeeding sheet bars are thinned into given shapes by this forming machine and both end portions of the bars are overlapped with each other and then such overlapped portion is pushed and spot welded.

However, the latter method has problems as mentioned below.

i) Time required for thinning the joining portions is long.

ii) When the joining is carried out at a state of stopping the press forming machine, a long loop is required, while when the joining is carried out during the running, a long running distance is required and the length of the equipment becomes long.

SUMMARY OF THE INVENTION

It is a first object of the invention to provide a continuous hot rolling method which simply and surely joins the sheet bars to each other without requiring complicated operation and can conduct the continuous rolling.

A second object of the invention is to provide a continuous hot rolling method which can conduct the joining between the sheet bars in a short time and advantageously enhance the joining strength between the sheet bars.

A third object of the invention is to propose a rapid and simple joining method applied to the continuous hot rolling method.

For advantageously achieving the above objects, the construction of the invention is as follows.

1. A method of continuously hot rolling sheet bars by continuously feeding a preceding sheet bar passed through a rough rolling step and a succeeding transferred sheet bar followed thereto into a finish rolling mill, wherein a front end portion of the succeeding sheet bar is butted to a back end portion of the preceding sheet bar at an entrance side of the finish rolling mill to generate a compression stress of not less than 1 kgf/mm² at a butted face between the end portions of the sheet jars, and then the sheet bars are bitten into the rolling mill at such a state.

2. A method of continuously hot rolling sheet bars wherein the butted face between the end portions of the sheet bars includes at least both side edge regions of the sheet bar in its widthwise direction.

3. A method of continuously hot rolling sheet bars by continuously feeding a preceding sheet bar passed through a rough rolling step and a succeeding transferred sheet bar followed thereto into a finish rolling mill, wherein a back end portion of the preceding sheet bar and a front end portion of the succeeding sheet bar are cut at an entrance side of the finish rolling mill into such a shape that at least both side edge regions of the sheet bars in the widthwise direction are contacted with each other at a butted state, and then both end portions are butted and preliminarily joined and thereafter bitten into the finish rolling mill.

4. A method of continuously hot rolling sheet bars, wherein before the butting between the back end portion of the preceding sheet bar and the front end portion of the succeeding sheet bar, the back end portion of the preceding sheet bar and the front end portion of the succeeding sheet bar are obliquely cut into a shape that opposed faces of both the sheet bars are parallel with each other at a given angle inclined with respect to the thickness direction of the sheet bar, and then preliminarily joined into a scarf state at both side edge regions in the widthwise direction of the sheet bar and unjoined regions in the widthwise direction of the sheet bar are joined in the finish rolling.

5. A method of continuously hot rolling sheet bars wherein each of the sheet bars is cut into a shape of contacting the sheet bars over the widthwise direction at a butted state between the front end portion and the back end portion.

6. A method of continuously hot rolling sheet bars wherein the preliminary joining is carried out by fixing a thin steel sheet to surfaces of the preceding sheet bar and the succeeding sheet bar to be rolled so as to cover a butted region therebetween, and the butted region is pushed in the rolling.

7. A method of continuously hot rolling sheet bars wherein a time of fixing the thin steel sheet after the cutting of the sheet bar is not more than 20 seconds.

8. A method of continuously hot rolling sheet bars wherein both side edge regions of the sheet bars in the widthwise direction are joined after the butting of the sheet bars and before the fixing of the thin steel sheet.

9. A method of joining sheet bars in hot rolling by joining a back end portion of a preceding sheet bar to a front end portion of a succeeding sheet bar in a transfer line at an entrance side of a finish rolling mill after rough rolling in the hot rolling, wherein a strong reduction is applied to the back end portion of the preceding sheet bar and the front end portion of the succeeding sheet bar to gradually reduce thicknesses of both end portions in a tapered form, and then the tapered portions of the preceding and succeeding sheet bars are overlapped with each other and subjected to a spot welding.

10. A method of joining sheet bars in hot rolling wherein an overlapped region between the back end portion of the preceding sheet bar and the front end portion of the succeeding sheet bar is both side edge regions in the widthwise direction of the sheet bar.

BRIEF DESCRIPTION OF DRAWINGS

FIGS. 1(a), (b) are diagrammatical views of a construction of a rolling equipment suitable for carrying out the invention;

FIG. 3 is a graph showing a relation between joining temperature of sheet bar and compression stress;

FIGS. 4(a)–(g) are schematic views showing various flat shapes of sheet bars;

FIGS. 5a), (b) are schematic views showing joined states between sheet bars;

FIG. 6 is a graph showing a joined margin of sheet bar and breakage state thereof;

FIG. 8 is a plan view of preceeding and succeeding sheet bars;

FIG. 9 is a schematical section view of preceding and succeeding sheet bars in thickness direction;

FIGS. 10(a) and 10(b) are schematic views showing a butted state between the back end portion of the preceding sheet bar and the front end portion of the succeeding sheet bar;

FIGS. 11(a) and 11(b) are schematic views showing a butt joined state between the back end portion of the preceding sheet bar and the front end portion of the succeeding sheet bar;

FIG. 12 is a section view of a central portion in widthwise direction of the sheet bars viewed from the thickness direction;

FIG. 13 is a schematic view showing a fixed state of a thin steel sheet according to claims 7 and 8;

FIG. 16 is a graph showing results measured with respect to the influence of a time after the cutting of the sheet bar upon a thickness of scale;

FIG. 17 is a graph showing results measured with respect to the influence of a time after the cutting of the sheet bar upon a joining strength;

FIGS. 18(a) and 18(b) are schematic views of a concrete means for fixing a thin steel sheet;

FIG. 20a is a plan view showing an overlapped state; and FIG. 20b is a side view showing a spot welding manner; and FIG. 21 is a partly enlarged view of an overlapped region.

DESCRIPTION OF PREFERRED EMBODIMENTS

Figure 2A:
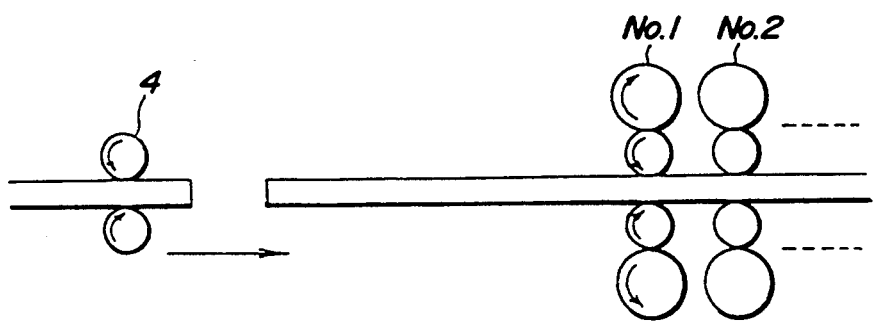
FIGS. 2(a)–(c) are schematic views showing the rolling manner according to claims 1 and 2.

In FIGS. 1(a), (b) is shown a main part of an equipment suitable for carrying out the present invention wherein numeral 1 is a finish rolling mill, numeral 2 a sheet bar preceedingly transferred at an entrance side of the finish rolling mill 1 (hereinafter referred to as a preceding sheet bar), numeral 3 a sheet bar succeedingly transferred following to the preceding sheet bar 2 (hereinafter referred to as a succeeding sheet bar), numeral 4 pinch rolls transferring the preceding and succeeding sheet bars 2, 3 and pushing in the joining thereof, and numeral 5 tap rolls arranged between the pinch roll 4 and the finish rolling mill 1 and serving to prevent upward and downward change or buckling of the sheet bars 2, 3.

Figure 2B:
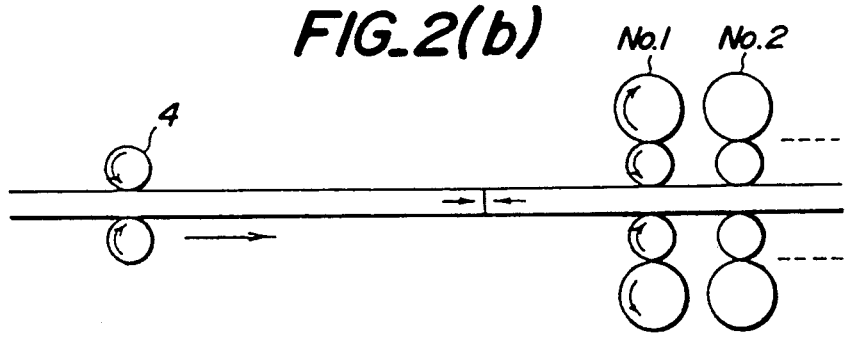
Figure 2C:
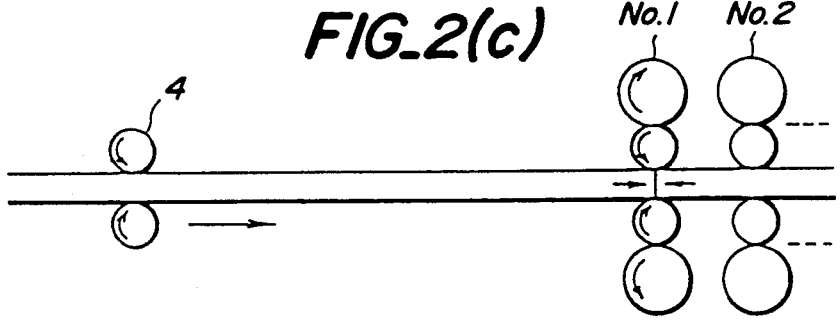

As shown in FIGS. 2(a)-(c), the rotating and driving speed of the pinch roll 4 is properly controlled at the entrance side of the finish rolling mill 1 to butt the back end portion and the front end portion of the sheet bars 2, 3, whereby a compression stress is generated to promote the joining of the sheet bars to a certain extent. Further, when the butted portion is bitten in the rolling mill, the sheet bars are surely closed to each other by the above compression stress and a compression stress generated in the rolling reduction. Thus, several to several ten sheet bars can continuously be rolled without requiring complicated operation and consuming power for the joining.

In the joining of the sheet bars at the entrance side of the rolling mill 1, if scale is formed in each end portion, the joining may not be promoted. Such a fear is not produced when the joining is conducted in about 20 seconds after the cutting of the sheet bar.

As the compression stress produced in the butted face between the sheet bars, it is desirable to be not less than 1 kgf/mm² as shown in FIG. 3. Furthermore, the reduction ratio in No. 1 rolling stand of the finish rolling mill 1 is desired to be not less than 30% for conducting the sure joining of the sheet bars.

According to the inventors' studies, in the rolling of the sheet bar, it is not necessary that the front end portion and the back end portion of the sheet bars be necessarily butted to each other over full area, and it has been found that it is enough to butt at least both side edge regions of the sheet bars in the widthwise direction to each other at a given ratio as shown in FIGS. 4(a)-(g).

The reason why the flat shapes shown in FIGS. 4(a)-(g) are preferable is due to the fact that in the continuous rolling of the sheet bars having, for example, a flat shape as shown in FIG. 5(a), if the front end of the succeeding sheet bar 3 and the back end of the preceding sheet bar 2 are joined and subjected to finish rolling, the joining region can be enlarged from both end portions toward a central portion in the widthwise direction by a metal flow in the finish rolling as shown in FIG. 5(b). In FIG. 6 are shown results examined on a relation between a joining margin of the sheet bars at the entrance side of the finish rolling mill and a presence or absence of breakage in the finish rolling. As seen from this figure, when a joining margin W of the sheet bars by pushing is not less than 0.1 times of a width B of the sheet bar per one-side, i.e. not less than 0.2 times in total, there is caused no breakage of joint portion in the rolling of the sheet bar.

FIG. 4(a) shows a case that the back end portion of the preceding sheet bar 2 and the front end portion of the succeeding sheet bar 3 are cut into concave shapes at the same curvature, and FIG. 4(b) shows a case that the cut front and back end portions of the sheet bars 2, 3 are concave but the curvatures thereof are different, and FIG. 4(c) shows a case that one of the cut front and back end portions is straight and only the other is concave, and FIG. 4(d) shows a case than one of the cut front and back end portions is convex and the other is concave and the curvature of the concave is somewhat larger than the curvature of the convex. In all of these cases, only both side edge regions of the sheet bars in the widthwise direction are contacted and a gap is formed in the central region, but the cut shape adaptable to the invention is not limited to the above cases. In the invention, there may be used a case that the front and back end portions are contacted at three points of both side edge regions and the central region as shown in FIGS. 4(e) and (f) to form gaps therebetween, or a case that the contact points are 4 or more and gaps are formed between these points as not shown. Further, the central region in the widthwise direction may be notched into a rectangular shape as shown in FIG. 4(g).

As a cutting means for the formation of the above shapes, use may be made of shear, gas cutting, laser cutting and the like. Particularly, when the end portion of the sheet bar is cut into concave shape at a specified curvature, a drum shear 6 having two curved edges (see FIG. 1) is advantageously suitable.

In the rolling of the sheet bar, a compression stress $\sigma_1$ is usually generated in a central region of the joint portion in the widthwise direction and a tensile stress $\sigma_2$ is generated at both side edge regions. In case of butting only both side edge regions as mentioned above, when the tensile stress $\sigma_2$ in the rolling is larger than a sum of compression stress $\sigma_3$ produced at the entrance side of the finish rolling mill and the compression stress $\sigma_1$ in the rolling, the sheet bars may not continuously be rolled, so that it is important to always hold $(\sigma_1+\sigma_3)>\sigma_2$ in the rolling.

The preliminary joining is conducted prior to the finish rolling and then the finish rolling is conducted instead of the case that the rolling is conducted at a state of applying compression stress to the butted faces of the sheet bars. Even in this case, the sure joining can effectively be attained. Furthermore, in the hot rolling according to the invention, tension may be applied at a hot finish rolling step, so that a high joining strength may be required for preventing the breakage of the joint portion by the application of tension.

As the preliminary joining, it is advantageous to use a scarf joining or fix a thin steel sheet to the butted region.

The case of using the scarf joining as a preliminary joining will be described below.

Figure 7A:
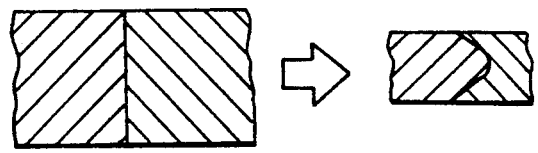
FIG. 7 is a schematic view showing a change of joined face in the thickness direction of the sheet bars before and after the rolling by a comparison between an example of not scarf joining (FIG. 7(a) and an example of scarf joining (FIG. 7(b))
Figure 7B:
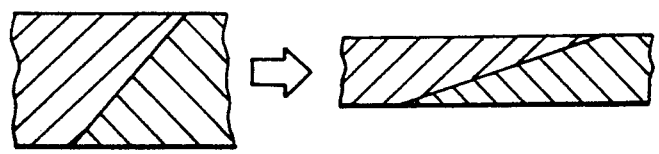

The change of the joint face in the sedition of the sheet bar in the thickness direction before and after the rolling is shown in FIG. 7 as a comparison between a case of no scarf joining (FIG. 7(a)) and a case of scarf joining (FIG. 7(b)). Thus, the joined area is increased by the scarf joining and also the shearing deformation amount of the joint portion by the rolling is increased to obtain a high joining strength.

In the continuous hot rolling using the scarf joining, the preceding sheet bar 7 and the succeeding sheet bar 8 are first cut at a butted state of both the sheet bars into a shape of contacting at least both side edge regions of the sheet bars in the widthwise direction as shown by a flat shape in FIG. 8. The cut shape is not limited to the embodiment shown in FIG. 8 and is possible to take various modifications as shown in FIG. 4. In this cutting, a drum shear having two curved edges is advantageously adaptable. Further, a shearing device of guillotine cutting system and the like may be used.

Then, as sectionally shown in the thickness direction in FIG. 9, the preceding sheet bar 7 and the succeeding sheet bar 8 are obliquely cut into a shape that the contact faces of the sheet bars at their butted state are parallel with each other at a given angle inclined with respect to the thickness direction of the sheet bar. In this figure, numeral 9 is a drum shear conducting the above cutting. In addition to the drum shear 9, a shearing device of guillotine cutting system and the like are advantageously adaptable in such a cutting. The inclination angle ($\alpha$ in FIG. 3) is preferable to be more than 0° but not more than 60° with respect to the thickness direction of the sheet bar.

At the above cutting steps, no special order is observed. Different from the above case, it may be taken to conduct the oblique cutting and then cut into a shape of contacting both side edge regions.

As shown in FIG. 10 as a plan view (FIG. 10(a)) and a section view in thickness direction (FIG. 10(b)), the back end portion of the preceding sheet bar 7 and the front end portion of the succeeding sheet bar 8 are butted and joined at a scarf joined state of both side edge regions of the sheet bars in the widthwise direction, and thereafter the rolling is conducted to join unjoined portions in the widthwise direction of the sheet bar.

The time from such cutting to subsequent joining step is short, so that the occurrence of scale on the cut surface is suppressed.

In the butt joining between the back end portion of the preceding sheet bar and the front end portion of the succeeding sheet bar, it is advantageously suitable to use a joining apparatus 11 as shown in FIG. 11 as a section view in thickness direction (FIG. 11(a)) and a plan view (FIG. 11(b)), for example, a spot welding apparatus or an induction heating pushing apparatus. In this figure, numeral 10 is a finish rolling mill.

Moreover, it has been confirmed that a minimum joined margin in the edge region of the sheet bar in the widthwise direction is at least 0.1 times, i.e. 0.2 times in total of the width of the sheet bar as each side edge region.

In case of scarf prejoining, it is favorable that the sheet bars are cut into a shape of contacting the sheet bars over their widthwise direction at a butted state between the front end portion and the back end portion as shown in FIG. 12 as a section in the thickness direction at a central region of the sheet bar in the widthwise direction in order to more advantageously improve the joining strength between the sheet bars.

As the preliminary joining, a case of fixing a thin steel sheet so as to cover the butted region will be described below.

Immediately after the cutting of each end portions of the sheet bars, a thin steel sheet is fixed so as to cover a butted region, whereby the cut portion serving as a joining face is shut off from air to suppress the formation and growth of scale, so that the lowering of the joining strength can be prevented. Further, the butted region between the sheet bars is subjected to plastic deformation at subsequent rolling step to thereby roll in the widthwise direction of the sheet bar, so that it is possible to more increase the joining strength.

In the continuous hot rolling using the scarf joining, the back end portion of the preceding sheet bar and the front end portion of the succeeding sheet bar are first cut at the entrance side of the hot rolling mill into a shape of contacting at least both side edge regions of the sheet bars in the widthwise direction at a butted state therebetween. Such a shape is previously described with reference to FIG. 4 and FIG. 8.

As the cutting method for the formation of such a shape, use may be made of any conventionally known methods such as shear, gas cutting, laser cutting and the like. Particularly, it is adaptable to conduct the cutting with the use of the drum shear having two curved edges.

Immediately after such a cutting, the back end portion of the preceding sheet bar and the front end portion of the succeeding sheet bar are butted to each other and then a thin steel sheet is fixed to surfaces of the sheet bars to be rolled so as to cover the butted regions. In FIG. 13 is shown an embodiment of such a fixed state of the thin steel sheet. In this figure, numeral 12 is a preceding sheet bar, numeral 13 a succeeding sheet bar, and numeral 14 a thin steel sheet as a seal plate. As the fixing of the thin steel sheet 14, complete welding to the sheet bar as a matrix and spot welding are adaptable because the cut portion is shut off from air. Furthermore, as a size of the thin steel sheet 14, the length (L in FIG. 13) is preferable to be 1.0–2.0 times of contact arc length $L_0$ of rolling at subsequent step. Moreover, a width of the thin steel sheet 14 (H in FIG. 13) is sufficient to cover a portion corresponding to a gap in a central region at the butted state between the sheet bars and may cover the full width of the sheet bar. And also, a thickness of the thin steel sheet 14 is preferable to be about 0.6–3.0 mm. The material of the thin steel sheet is favorable to be the same as in the material to be rolled.

Figure 14:
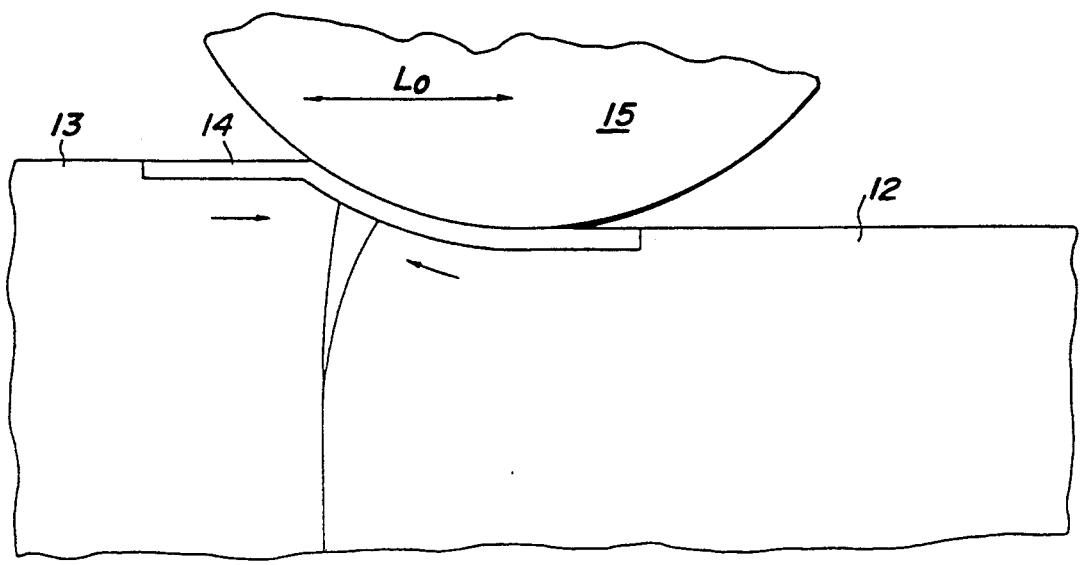
FIG. 14 is a schematic section view showing a rolling reduction state in the rolling according to claims 7 and 8.

Then, the rolling is conducted. When the thin steel sheet is fixed to the surfaces of the sheet bars to be rolled so as to cover the butted regions at the prestep according to the invention, as sectionally shown in FIG. 14, stress in a direction of clogging the gap in the joint portion (an arrow in FIG. 14) is produced in the rolling, and the gap is clogged by plastic deformation from a center of the sheet bar in the thickness direction to the surface to be rolled (outer surface) to roll the sheet bars and hence the joining strength can be improved. In this figure, numeral 15 is a rolling roll.

Figure 15:
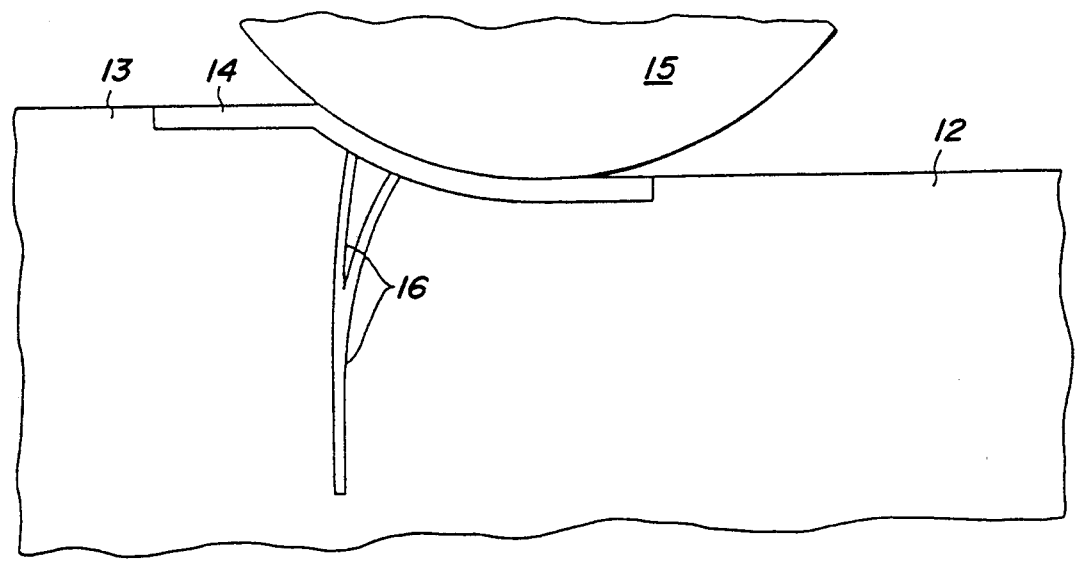
FIG. 15 is a schematic section view showing the formation of scale in the rolling according to the conventional technique.

It is favorable to shorten the time from the cutting of the sheet bar to the fixation of the thin steel sheet as far as possible. When the time from the cutting to the fixation of the thin steel sheet is too long, as sectionally shown in FIG. 15, scales 16 are produced on the surface to be rolled to lower the joining strength. FIGS. 16 and 17 are graphs showing results measured with respect to the influence of the time after the cutting of the sheet bar upon the thickness of scale and the joining strength, respectively. Moreover, the joining strength was measured by conducting a cold tensile test on a test specimen obtained by butting sheet bars of material: SS41, width: 1000 mm and thickness: 30 mm to each other, fixing a seal plate (material: SS41) to the butted region after various times of the butting and then rolling to a thickness of 20 mm with a rolling roll of diameter: 700 mm. From these graphs, it is apparent that the time up to the sealing after the cutting is preferably not more than 20 seconds in order to obtain a desired joining strength.

Furthermore, it is desirable that both side edge regions of the sheet bars in the widthwise direction are joined after the butting of the sheet bars and before the fixation of the thin steel sheet in order to more improve the joining strength. Such a joining of both side edge regions of the sheet bars in the widthwise direction is somewhat promoted even by the pushing of the sheet bars to each other, so that when the heating is conducted with such a pushing, the joining is effectively promoted and it is advantageous to shorten the joining time. As a heating means, use may be made of gas burner, conductor heating, induction heating and the like, among which a system of applying alternating magnetic fields to the sheet bar so as to pass through the sheet bar in the thickness direction is advantageously adaptable.

As a concrete example of the fixation of the thin steel sheet according to the invention is shown in FIG. 18, it is sufficient to use a seal plate welding device 19 (FIG. 18(a)) or an end portion joining device 20 including the seal plate welding device (FIG. 18(b)) between a rolling mill 17 and a drum shear 18 in the transfer line of the sheet bar.

Since the scarf joining is conducted the end face of the sheet bar is previously subjected to cutting twice to form a given end face shape, but a strong reduction is added to the end portion of the sheet bar instead of the cutting, whereby the thicknesses of the end portions of the sheet bars are gradually reduced in a tapered form for joining.

In FIGS. 19(a)-(f) are shown the joining manner according to the invention in accordance with a time series. In this figure, numerals 21, 22 are a preceding sheet bar and a succeeding sheet bar, respectively, numeral 23 a final stand of a rough rolling mill, numeral 24 a cutting device, and numeral 25 a first stand of a finish rolling mill.

Figure 19A:
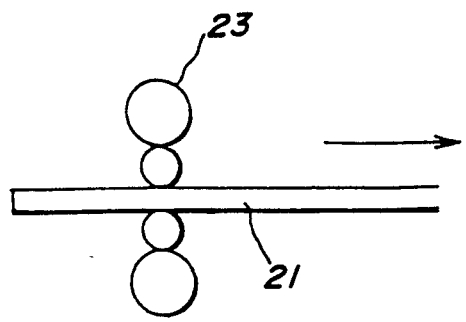
FIGS. 19a-19f are schematic views showing the joining manner according to the present invention, respectively.
Figure 19B:
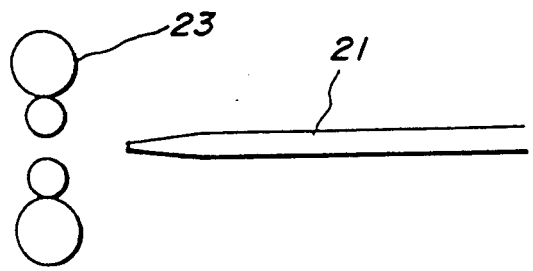
Figure 19C:
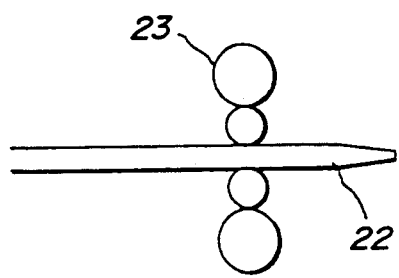
Figure 19D:
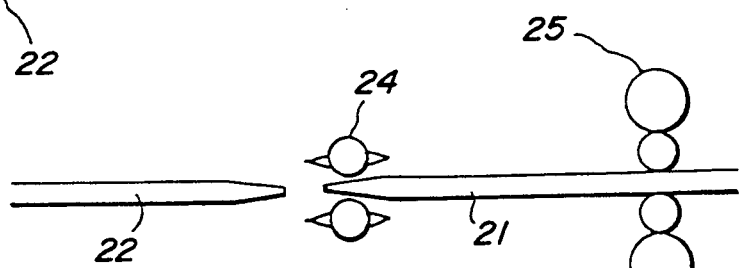
Figure 19E:
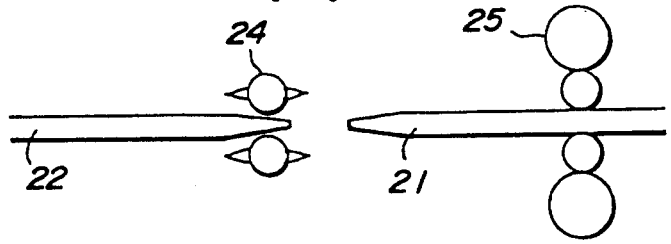
Figure 19F:
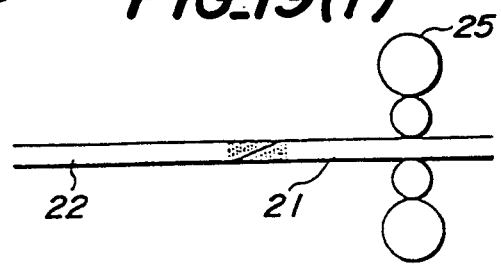

According to the invention, a back end portion of the preceding sheet bar 21 at a rough rolling stage (FIG. 19(a)) is thinned in a taper form (FIG. 19(b)). Similarly, a front end portion of the succeeding sheet bar 22 is thinned in a taper form (FIG. 19(c)). Then, the shapes in the back end portion of the preceding sheet bar 21 and the front end portion of the succeeding sheet bar 22 are uniformized by cutting (FIGS. 19(d,e)) and then both end portions are overlapped with each other to conduct spot welding (FIG. 19(f)).

Thereafter, the sheet bars are fed into the finish rolling mill to continue the continuous rolling.

In the uniformization by cutting the shapes in the back end portion of the preceding sheet bar and the front end portion of the succeeding sheet bar, the butting portion is sufficient to have a flat shape, but as shown in FIG. 20, both side edge regions are fishtail and the overlapping regions of the sheet bars are restricted to these both side edge regions in the widthwise direction, which are particularly advantageous in order to simplify the spot welding treatment and further mitigate a rolling load in the finish rolling. In this case, it has been confirmed that a minimum joined margin is at least 0.1 times of the width of the sheet bar at each side edge and 0.2 times in total.

Furthermore, it has been confirmed that as shown in FIG. 21, when the thickness of the joint portion after the overlapping is within a range of not more than 1.3 times of the thickness of the sheet bar, the strong joint portion is obtained without causing troubles in the subsequent finish rolling. Therefore, it is desirable that the thickness of the joint portion is not more than 1.3 times of the sheet bar thickness, and in this case it is not required to conduct the rolling reduction in the spot welding.

BEST MODE FOR CARRYING OUT THE INVENTION

Example 1

By using an equipment provided with 7 stand tandem rolling mill as shown in FIG. 1, sheet bars (low carbon steel) having a width of 1000 mm and a thickness of 30 mm and a flat shape of a butted portion were pushed under the following conditions to generate compression stress in the butted faces of the sheet bars, and then fed at such a state into the rolling mill to obtain a hot rolled sheet of 3 mm in thickness.

a. pushing force: 1 kgf/mm$^2$ as a contact pressure
b. reduction ratio in No. 1 mill in the finish rolling mill: 30%

As a result, the stable rolling could be conducted without causing the breakage of the joint portion in the rolling. Furthermore, the production efficiency could be increased by about 10% as compared with the rolling under the same conditions through the conventional high frequency heating system.

Furthermore, sheet bars of low carbon steel having a width of 1000 mm and a thickness of 30 mm and a flat shape as shown in FIG. 4(a), in which radii of curvature of front end portion and back end portion were 20 m, were hot rolled under the following conditions:

a. pushing force: 1 kgf/mm$^2$ as a contact pressure
b. reduction ratio at No. 1 mill: 30%

,during which the rolling state was examined. Even in such a rolling, the stable rolling could be conducted without causing the breakage of the joint portion in the rolling.

Example 2

By using an equipment provided with 7 stand tandem rolling mill as shown in FIG. 11, sheet bars of low carbon steel having a thickness of 30 mm and a width of 1200 mm were cut into a curved shape that the back end portion of the preceding sheet bar and the front end portion of the succeeding sheet bar had a radius of curvature of 19 m as shown in FIG. 8 and then obliquely cut at an angle of 45° with respect to the thickness direction of the sheet bar. Thereafter, both side edge regions of the sheet bars in the widthwise direction were butted to each other and joined by spot welding, which was fed into a finish rolling mill to obtain a hot rolled sheet of 3 mm in thickness.

As a result, even when tension was applied in the rolling, the stable rolling could be conducted without causing the breakage of butt joined portion in the rolling.

Moreover, when the sheet bars were cut into such a shape that only both side edge regions of the sheet bars in widthwise direction were contacted and the central portions were overlapped at a butt pushed state between the front end portion and the back end portion by changing the radius of curvature to 60 m and the angle with respect to the thickness direction of the sheet bar to 30°, the joined state became further strong and even if tension was applied in the rolling, the stable rolling could be conducted without the breakage of the butt joined portion between the sheet bars.

Example 3

By using an equipment provided with 7 stand tandem rolling mill as shown in FIG. 18(a), sheet bars of low carbon steel having a thickness of 30 mm and a width of 1000 mm were cut into a curved shape that the back end portion of the preceding sheet bar and the front end portion of the succeeding sheet bar had a radius of curvature of 20 m as shown in FIG. 13 and immediately butted at both side edge regions in the widthwise direction. Then, a thin steel sheet having the same material as in the sheet bar and a length of 100 mm, a width of 1000 mm and a thickness of 2.3 mm was fixed to each surface of the butted region by sopt welding, which was fed into the finish rolling mill to obtain a hot rolled sheet of 3.2 mm in thickness. The time up to the fixation of the thin steel sheet after the cutting was 20 seconds.

As a result, the stable rolling could be conducted without causing the breakage of the joint portion in the rolling even when tension was applied in the rolling. The joining strength of the thus obtained hot rolled sheet was 12 kgf/mm$^2$.

Then, when the time from the cutting to the fixation of the thin steel sheet was made faster to 5 seconds, the joining state became further strong, so that even when tension was applied in the rolling, the rolling could stably be conducted without causing the breakage of the joint portion in the rolling. Moreover, the joining strength of the thus obtained hot rolled sheet was 28 kgf/mm$^2$.

Moreover, the above sheet bars were butted at both side edge regions in the widthwise direction and joined by applying the alternating magnetic fields so as to pass through the sheet bar in the thickness direction while pushing the sheet bars to each other at a pushing force of 2.0 kgf/mm$^2$ prior to the fixation of the thin steel sheet. The joined margin was 100 mm at the end portion. As a result, the joined state became further strong, so that even when tension was applied in the rolling, the stable rolling could be conducted without causing the breakage of the joint portion in the rolling. The joining strength of the thus obtained hot rolled sheet was 30 kgf/mm$^2$.

Example 4

By using an equipment provided with 7 stand tandem rolling mill as shown in FIG. 20, preceding and succeeding sheet bars of low carbon steel having a thickness of 30 mm and a width of 1000 mm and a cut shape that the overlapped portion was cut into fish-tail by means of a crop shear were joined by subjecting to spot welding at their edge regions under the following conditions, which were fed into the finish rolling mill to obtain a hot rolled sheet of 3 mm in thickness.
a. overlapped margin: 100 mm from each edge
b. thickness after spot welding of overlapped portion: 38 mm As a result, the stable rolling could be conducted without causing the breakage of the overlapped and spot welded portion between the sheet bars in the rolling. Furthermore, the time required for the joining could be shortened by about 5 seconds as compared with the rolling under the same conditions through the conventional thickness reduction pressing system.

INDUSTRIAL APPLICABILITY

According to the invention, the butted portion between the sheet bars is not broken in the rolling, so that the continuous hot rolling can be realized in a high productivity with the omission of complicated joining operation for joining the sheet bars as a prestige of the rolling step and hence the invention largely contributes to stably and continuously conduct hot rolling.

We claim:

1. In a method of continuously hot rolling sheet bars by continuously feeding preceding sheet bar passed through a rough rolling strep and a succeeding transferred sheet bar followed thereto into a finish rolling mill, the improvement wherein a front end portion of the succeeding sheet bar is butted to a back end portion of the preceding sheet bar before an entrance side of the finish rolling mill so as to contact at least both widthwise side edge regions in the front end portion of the succeeding sheet bar with at least both widthwise side edge regions in the back end portion of the preceeding sheet bar at a compression stress of not less than 1 kgf/mm$^2$, and then the sheet bars are continuously fed into the finish rolling mill at such a butted state.

2. The method according to claim 1, wherein each of said both widthwise side edge regions is not less than 0.1 times a width of said sheet bar.

3. In a method of continuously hot rolling sheet bars by continuously feeding a preceding sheet bar passed through a rough rolling step and a succeeding transferred sheet bar followed thereto into a finish rolling mill, the improvement wherein a back end portion of the preceeding sheet bar and a front end portion of the succeeding sheet bar are cut before an entrance side of the finish rolling mill into such a shape that at least both widthwise side edge regions in the front end portion of the succeeding sheet bar are contacted with at least both widthwise side edge regions in the back end portion of the preceding sheet bar and thereafter butted and preliminarily joined with each other and then continuously fed into the finish rolling mill at such a butted state.

4. The method according to claim 3, each of said both widthwise side edge regions is not less than 0.1 times at width of said sheet bar.

5. The method according to claim 3, wherein before the butting between the preceding sheet bar and the succeeding sheet bar, said back end portion of the preceding sheet bar are obliquely cut into a shape that opposed faces of both the sheet bars are parallel with each other at a given angle inclined with respect to the thickness direction of the sheet bar and thereafter the cut end portions of these sheet bars are butted at a scarf state before the preliminary joining.

6. The method according to claim 3, wherein the preliminary joining is carried out by fixing a thin steel sheet onto outer surfaces of the preceding and succeeding sheet bars to be rolled so as to cover a butted region therebetween.

7. The method according to claim 6, wherein a time of fixing the thin steel sheet is not more than 20 seconds.

8. In a method of joining sheet bars by joining a back end portion of a preceding sheet bar to a front end portion of a succeeding sheet bar in a transfer line on an entrance side of a finish rolling mill after rough rolling in the hot rolling, the improvement wherein a strong reduction is applied to each of the back end portions of the preceding sheet bar and the front end portion of the succeeding sheet bar to gradually reduce a thickness of each end portion in a tapered form, and the thus tapered portions of the preceding and succeeding sheet bars are overlapped with each other and subjected to a spot welding before the entrance side of the finish rolling mill.

9. The method according to claim 8, wherein the overlapped portions of the preceding and succeeding sheet bars are at least both widthwise side edge regions of each of the sheet bars.

* * * * *